July 4, 1972  P. H. JONSSON  3,674,370
CHEMICAL OXYGEN DEMAND WATER ANALYZER
Filed May 11, 1970
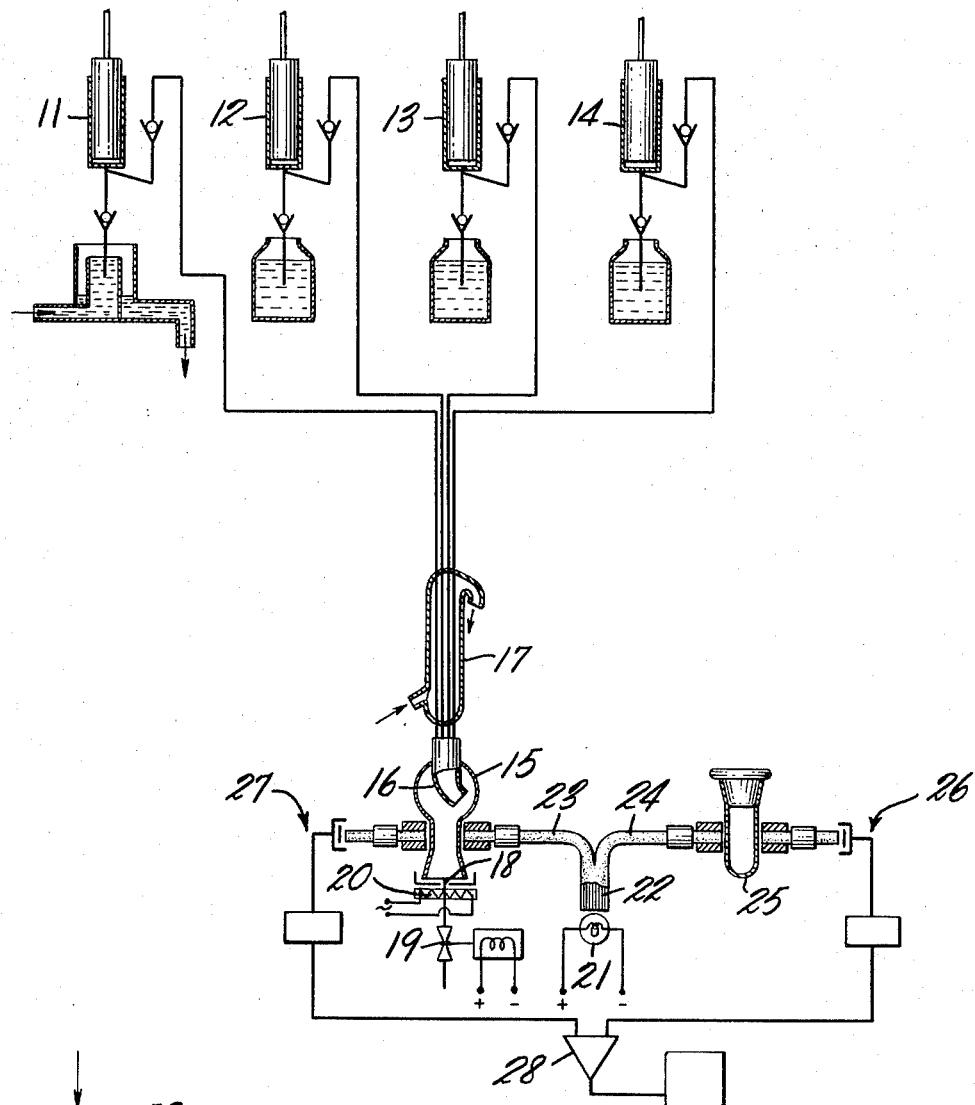
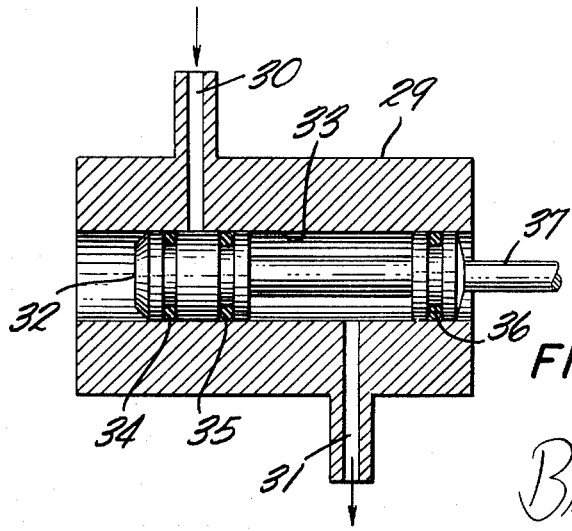
INVENTOR.
PER HJALMAR JONSSON
BY
Brumbaugh, Graves, Donohue & Raymond
his ATTORNEYS.

United States Patent Office 3,674,370
Patented July 4, 1972

3,674,370
CHEMICAL OXYGEN DEMAND WATER ANALYZER
Per Hjalmar Jonsson, Nynaeshamn, Sweden, assignor to Rederiaktiebolaget Nordstjernan, Nynaeshamn, Sweden
Filed May 11, 1970, Ser. No. 36,316
Claims priority, application Sweden, Jan. 30, 1970, 1,211/70
Int. Cl. G01n *1/00, 21/20, 21/22*
U.S. Cl. 356—36
7 Claims

ABSTRACT OF THE DISCLOSURE

In the representative embodiments of the invention described herein, a chemical oxygen demand water analyzer includes a reaction vessel to receive a water sample and dosage devices to supply measured quantities of dichromate and acid. A heater controls the temperature of the mixture in the vessel and a spectrophotometer determines the concentration of trivalent chromium in the vessel.

BACKGROUND OF THE INVENTION

The present invention relates to devices for the determination of the oxygen demand of water.

With the growing concern over the environmental problems facing our country as well as other industrially oriented countries, the revitalization of polluted waters and conservation of sound water supplies is of critical importance. To that end, the analysis of water as a means of checking the effectiveness of water purification plants is of equal import.

One of the critical parameters of water quality or pollution strength is the amount of oxygen consuming material, chiefly organics, present in the water, which place a demand upon oxygen in the water. The chemical oxygen demand of a water sample is generally determined by treating the sample with a dichromate, e.g., potassium dichromate in a sulfuric acid solution, boiling the solution and thereafter spectrophotometrically determining the amount of trivalent chromium found therein or by titremetric determination of the non-consumed dichromate.

Previously, it has been difficult to automate the different steps in the process for determining the chemical oxygen demand of water. While the principles of automatic sampling and dosing are well-known, there have been considerable problems in automatically dosing viscous, heavy and aggressive liquids such as concentrated sulfuric acid.

Heretofore, it has not been possible to measure the amount of absorption in a boiling solution in view of the fact that while boiling, the bubbles disturb the photometric measurements; hence time was unnecessarily spent in attaining a stable temperature in the sample solutions before making a photometric determination. It has now been found that the light absorption varies with temperature. Presumably the varying absorption is due to displacement of the equilibrium among different anion complexes of $Cr^{3+}$ with varying temperatures. The chromium ion is in fact known to have a marked tendency to form complexes of various kinds and the variation of the absorption has been found to be esepcially noticeable at higher temperatures of the solution.

To obtain the necessary radiation for the photometric determination of trivalent chromium (absorption maximum of $Cr^{3+}$ is about 600 m$\mu$) costly monochromators of different design or absorption or interference type filters had to be employed. The photometric measurements were carried out so that the light absorption of the sample was compared with the absorption of a reference sample with a known absorption. In making these measurements it was preferred to use a single light source and detector for the two samples, so that possible error depending on differences in the equipment would thereby be eliminated. This was achieved by using a conventional double beam photometer or beam splitting devices where the splitting and bringing together of two measuring beams was accomplished by means of prisms or semitranslucent mirrors. In spite of the expensive equipment, the risk of error was high, since coatings often form on the optically active surfaces and particularly so after prolonged use of said equipment. Moreover, the presence of aggressive chemicals like dichromate and sulfuric acid could easily affect the fragile optical components of the photometers and thereby impair the results.

SUMMARY OF THE INVENTION

Accordingly, it is an object of the present invention to provide an inexpensive apparatus for automatically measuring the chemical oxygen demand of water.

A further object is to provide an apparatus for the above analysis wherein the component parts are less sensitive than those found in conventional equipment to the corrosive environment in which they must operate.

Still a further object is a water analyzing apparatus which operates intermittently rather than continuously, thereby lowering operating costs.

These and other objects are accomplished by treating a water sample with a dichromate in acid solution and determining the amount of trivalent chromium formed. In a particular form of apparatus for carrying out the invention a combined reaction and measuring vessel receives the water sample and reagent solutions are fed to the vessel by means of sampling and dosage devices. The reaction vessel is provided with a heater for heating the reaction mixture and a spectrophotometer for the spectrophotometric determination of $Cr^{3+}$.

Further objects and advantages of the invention will be apparent from a reading of the following detailed description taken in conjunction with the following drawings:

BRIEF DESCRIPTION OF THE DRAWINGS

In the drawings:

FIG. 1 is a schematic diagram illustrating a representative form of apparatus for carrying out the invention; and FIG. 2 is a schematic sectional view illustrating an alternative form of bottom drain for use in the apparatus of FIG. 1.

DESCRIPTION OF THE PREFERRED EMBODIMENTS

In the typical embodiment of the invention shown schematically in FIG. 1, the sample, the dichromate, the acid and a standard solution are dosed by means of single-stroke dosage pumps 11, 12, 13 and 14 respectively, which are preferably actuated by electric motors with linear motion (not shown). The sequence and time interval of the action of the different pumps is controlled by a conventional programming unit, which also controls the actuation of the other components in the apparatus. The measured liquid portions are directed to a combined measuring and reaction vessel 15, consisting of a flask fused together with a splash trap 16 and provided with a reflux cooler 17 and a bottom outlet. The bottom outlet is designed as a hose of fluorine rubber 18, and provided with a magnetically driven hose clamp 19. The flask and its contents are heated by means of a heating coil 20.

A glow-discharge lamp e.g. helium-neon filled, 21 and which emits strongly in the region of 600 m$\mu$, is used as a light source for the photometric analysis. This lamp transmits light to a fiber-optical type light guide 22 having two branches 23 and 24. The light transmitted through the branch line 23 passes through the test solution in the reaction vessel 15 and the other branch line 24 transmits the light through a vessel 25 which contains a reference solution. From the vessels 15 and 25 the branch lines lead to two photo detectors, e.g. cadmium sulfide cells, 26 and 27 respectively, and the currents obtained in the photo detectors are log-converted and compared in a conventional electronic current-comparing unit 28. The result obtained is then registered by means of a recorder (not shown).

FIG. 2 illustrates an alternative bottom drain for the reaction vessel which may be used in place of the hose 18 and clamp 19. In the drain of FIG. 2, a valve body 29 is provided with an inlet 30 connectable to the vessel 15 of FIG. 1 and an outlet 31 connectable to a suitable drain (not shown). A slide 32 travels within the valve body 29 and is provided with an aperture 33, produced by turning down the stock of the slide to a smaller diameter. The slide is preferably cylindrical in shape, but other embodiments are possible. Packings 34, 35 and 36 are arranged as seals between the slide 32 and the valve body 29, and as shown in FIG. 2, may consist of O-rings accommodated by grooves turned in the slide. Other types of seals, e.g., lip seals may also be used, especially when the slide is not cylindrical. At one end, the slide is connected to a rod 37, which is attached to an electric motor with linear motion (not shown) or other suitable means for actuating the slide. The actuating means is acted upon by impulses from the program unit. All parts that may come in contact with aggressive solutions are made of corrosion-resistant materials, such as glass, fluoroplastics, acid proof steel or the like.

In FIG. 2, the slide 32 is shown in a closed position. To open, the slide is shifted so that the aperture 33 will communicate with both the inlet 30 and the outlet 31. The size of the aperture 33 in slide 32 must be such that both inlet and outlet can be cleared at the same time.

The advantage of a bottom drain according to FIG. 2 is that a good seal is obtained and no rotary motions are required in opening or closing said drain. A further advantage is that with a concentric channel in the circular slide, the opening and closing are not affected if the slide should rotate in the valve housing.

The water to be examined can be taken out from a line, in which it is continuously flowing, and the inlet may be provided with a screen to prevent possible sludge and solid materials from being sucked in. The dosage pump for the sample is washed before each analysis with the tested water so that a sample of current interest is obtained.

In operation, when a representative sample of fixed volume has been charged into the reaction vessel 15 by the pump 11, the program unit causes a measured volume of dichromate solution to be supplied to the reaction vessel by the pump 12 and a measured quantity of acid by the pump 13. Current is then supplied to the heating coil to heat the contents of the flask to the boiling point. Should the water sample contain large amounts of chloride ions, they may be complexed by adding an appropriate quantity of divalent mercury ions from another dosage pump (not shown) the appropriate volume having been predetermined and programmed in the programming unit. Alternatively potassium dichromate could be dissolved in the acid and the solution dosed by one of the pumps 12 or 13. The other pump could then be used for the complexing medium.

The amounts of test water and dichromate solution charged into the reaction vessel are predetermined by simple tests. These amounts are dependent on the COD value of the tested water and on the strength of the dichromate solution used so that a higher COD value requires a larger amount of oxidation agent or a minor amount of sample.

The reaction mixture is kept at constant temperature such as by boiling for a period sufficient to cause the oxidizable material in the sample to convert the dichromate ions to trivalent chromium ions. This period can also be determined by simple preliminary tests. When the mixture has boiled for the necessary time, the photometric measurement is started by a pulse from the program unit. The measurement is preferably carried out on the boiling solution, and in this way the measurement is always made at the same temperature so that errors arising from a fluctuating temperature are avoided. In the past, it has not been possible to carry out photometric measurements on a boiling solution, because the bubbles formed on boiling would disturb the results. However, the use of a detector having a sufficiently high time constant does not react to the bubbles and therefore gives a stable output of current, which when compared with the measuring result from a reference sample, provides an exact and reproducible measurement of the trivalent chromium ion. The reference sample is present in a flask having similar dimensions as that of reaction vessel.

If the dichromate can be converted to $Cr^{3+}$ at a lower temperature and temperature control can be maintained, it is not essential that the reaction solution be heated to the boiling point. Since the $Cr^{3+}$ absorption varies with the temperature, all that is necessary is for a constant temperature to be maintained in the reaction solution. Moreover, the heating stage of the process may be wholly omitted if the heat generated upon addition of the sulfuric acid to the reaction solution is sufficient to accomplish the dichromate conversion. In both of these latter instances an agitator is required in the reaction solution to provide a homogeneous solution along with a device, such as a thermostat, that will maintain the solution at a constant temperature before each photometric measurement.

At uniform intervals of time a standard solution with a known COD value is fed into the reaction vessel by the pump 14 on a pulse from the program unit and a similar test is conducted. These results are used for the control of the reagent solutions and the equipment. Suitable standard solutions are glucose, potassium-hydrogen phthalate solutions. The strength of the latter compound can be acidimetrically determined, and therefore is the most advantageous standardizing solution.

The results obtained from the photo detector are evaluated, added logarithmically and read out on a recorder. The evaluation unit is connected to the aforementioned program unit, which controls the various functions of the entire apparatus according to a pre-set program. By means of this program, it is possible to set times for the different steps of the process, and by using different settings the functions of the equipment are adapted to the conditions existing in each particular case.

Both the program and evaluation units are constructed from electronic components and preferably microcircuits. The use of integrated circuits in the control phase of the apparatus renders it insensitive to the working environment. By including the "wet" components, i.e. the dosing apparatus and the reaction vessel in one hermetically sealed compartment and the electronic components, i.e. the programmer, photometer, driving circuits and recorder in a separate sealed compartment, connected to the "wet" compartment only by electrical cables and fiber optic light guides, the reliability is improved.

Accordingly, the steps in the process of analyzing water on the basis of its chemical oxygen demand are as follows:

(1) A water sample with a definite volume is taken out and charged into a reaction vessel.

(1a) If the sample contains great amounts of chloride ions, which would disturb the analysis, these ions are complexed by the addition of divalent mercury ions.

(2) The sample is reacted with a definite volume of sulfuric acid and potassium dichromate solution. Silver sulfate may be used as catalyst.

(3) The mixture is boiled under reflux in the reaction vessel for a definite period.

(4) While the mixture is still boiling, the amount of Cr³⁺ formed in the reaction vessel is determined.

(5) The result of the measurement is converted electronically into milligrams of oxygen demanded per liter of water and registered by means of a recorder.

(6) At definite intervals established by means of a program prepared in advance, the sample in the vessel 15 is replaced with a standard solution by the dosage pump 14 for calibration purposes.

While the fundamental and novel features of the invention have been shown and described, it will be understood that various substitutions, changes and modifications in the form and details of the apparatus illustrated may be made by those skilled in the art without departing from the spirit of the invention. Accordingly, all such modifications and variations are included within the intended scope of the invention as defined by the following claims.

I claim:

1. Apparatus for the automatic and intermittent determination of the chemical oxygen demand of an aqueous solution or dispersion, wherein a sample of said solution or dispersion is treated with a dichromate reagent and the mixture is heated to its boiling point, and the amount of trivalent chromium formed is determined by means of a spectrophotometer while the mixture is boiling, said apparatus comprising:
   (a) a reaction vessel with automatic dosage means for the solution or dispersion and for the dichromate reagent;
   (b) a light source, having an emission maximum at about the absorption maximum for the trivalent chromium ion, which illuminates the solution or dispersion in said reaction vessel;
   (c) a photodetector having a sensitivity maximum at about said absorption maximum;
   (d) heating means capable of heating the mixture in the reaction vessel to its boiling point; and
   (e) a photodetector cell responsive to illumination from the mixture in the reaction vessel, said cell having a high time constant in order to make measurements on said boiling mixture without interference from bubbles.

2. Apparatus according to claim 1, further comprising fiber optical means for conducting light from the source to the spectrophotometer.

3. Apparatus according to claim 1, further comprising at least one linear induction motor, actuating said dosage means.

4. Apparatus according to claim 1, wherein the light source has an emission maximum at a wavelength of about 600 m$\mu$, and the photodetector has a sensitivity maximum at a wavelength of about 600 m$\mu$.

5. Apparatus according to claim 4, wherein the light source is a glow discharge lamp.

6. Apparatus according to claim 5, wherein the glow discharge lamp is filled with neon.

7. Apparatus according to claim 1, wherein the photodetector is a cadmium sulfide cell.

References Cited

UNITED STATES PATENTS

| | | | |
|---|---|---|---|
| 2,324,304 | 7/1943 | Katzman | 250—227 X |
| 3,481,674 | 12/1969 | Koester | 356—201 |

FOREIGN PATENTS

| | | |
|---|---|---|
| 793,792 | 1/1956 | Great Britain. |
| 204,368 | 11/1957 | Sweden. |

RONALD L. WIBERT, Primary Examiner

C. CLARK, Assistant Examiner

U.S. Cl. X.R.

250—218; 356—206